United States Patent
O'Byrne

(10) Patent No.: US 9,179,203 B2
(45) Date of Patent: Nov. 3, 2015

(54) OPTICAL NETWORK SYSTEM ARCHITECTURE

(71) Applicant: Verizon Patent and Licensing Inc., Basking Ridge, NJ (US)

(72) Inventor: Vincent O'Byrne, Boston, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 75 days.

(21) Appl. No.: 14/041,746

(22) Filed: Sep. 30, 2013

(65) Prior Publication Data

US 2015/0093110 A1    Apr. 2, 2015

(51) Int. Cl.
| | |
|---|---|
| *H04B 10/00* | (2013.01) |
| *H04J 14/00* | (2006.01) |
| *H04B 10/12* | (2006.01) |
| *H04Q 11/00* | (2006.01) |
| *H04B 10/27* | (2013.01) |
| *H04B 10/032* | (2013.01) |

(52) U.S. Cl.
CPC ......... *H04Q 11/0005* (2013.01); *H04B 10/032* (2013.01); *H04B 10/27* (2013.01); *H04Q 2011/0037* (2013.01); *H04Q 2011/0079* (2013.01)

(58) Field of Classification Search
None
See application file for complete search history.

(56) References Cited

U.S. PATENT DOCUMENTS

| | | | |
|---|---|---|---|
| 2002/0109876 A1* | 8/2002 | Eijk et al. | 359/110 |
| 2005/0031348 A1* | 2/2005 | Choi et al. | 398/59 |
| 2010/0098407 A1* | 4/2010 | Goswami et al. | 398/5 |
| 2010/0111537 A1* | 5/2010 | Cheng et al. | 398/82 |
| 2011/0158638 A1* | 6/2011 | Mie et al. | 398/16 |
| 2011/0317995 A1* | 12/2011 | Zheng | 398/2 |
| 2012/0045199 A1* | 2/2012 | Sun et al. | 398/5 |
| 2013/0121684 A1* | 5/2013 | Smith et al. | 398/5 |

OTHER PUBLICATIONS

Zhou et al., Traffic scheduling in hybrid WDM-TDM PON with wavelength-reuse ONUs, 2012, Springer Science + Business Media, pp. 151 and 154.*

* cited by examiner

*Primary Examiner* — Ken Vanderpuye
*Assistant Examiner* — Jai Lee

(57) ABSTRACT

Optical devices in optical network exchange signals at a plurality of wavelengths via a plurality of pathways. Each of the optical devices is associated with a corresponding wavelength and includes multiple optical inputs/outputs (I/Os) to exchange signals at the corresponding wavelength via the plurality of pathways. During maintenance or failure of one of the optical I/Os in an optical device associated with a wavelength, communications are maintained in the optical network by switching communications at a same wavelength to another a different pathway and/or reforming the optical network using other wavelengths. For example, an optical network unit (ONU) may identify an error in a first wavelength associated with a first optical device included in an optical line terminal (OLT) and may forward data using a second wavelength associated with the other optical device included in the OLT.

20 Claims, 7 Drawing Sheets

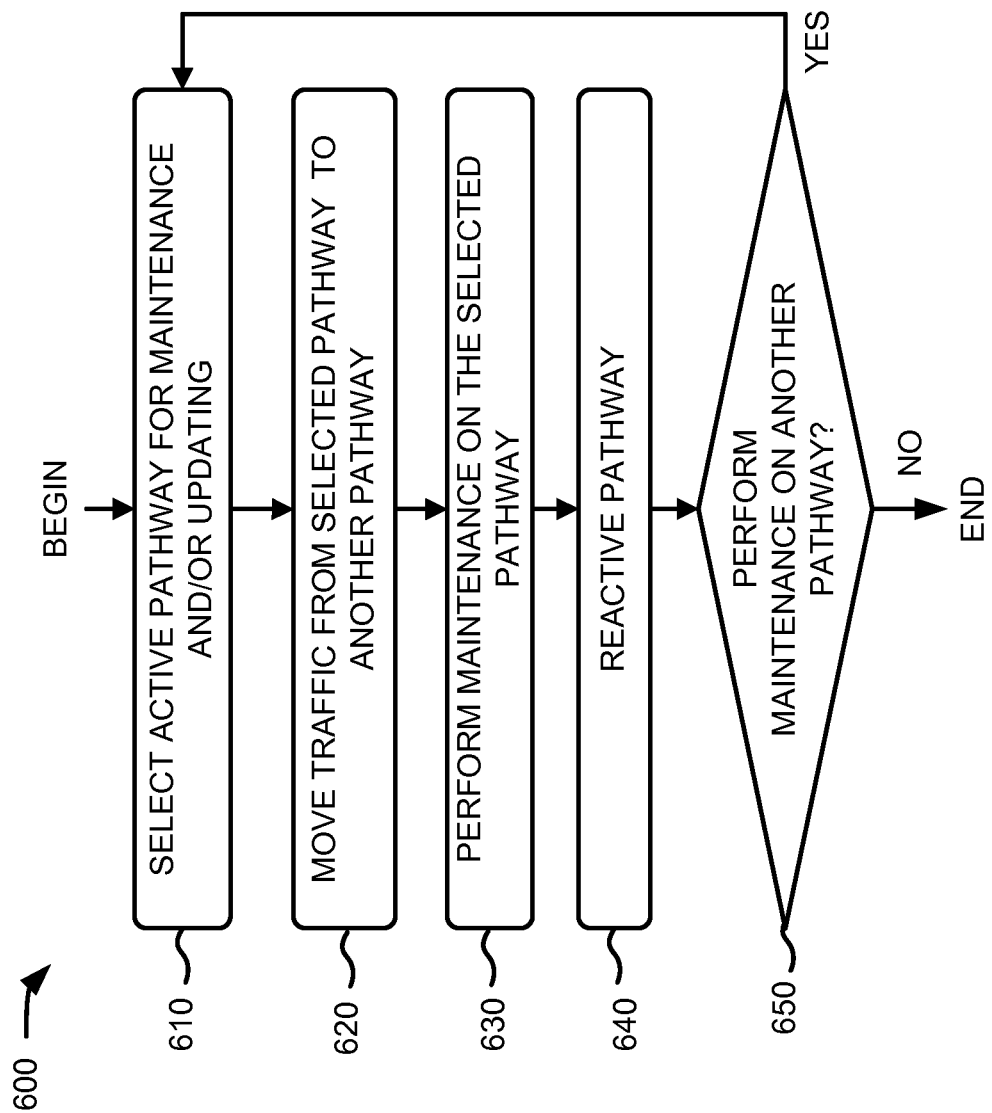

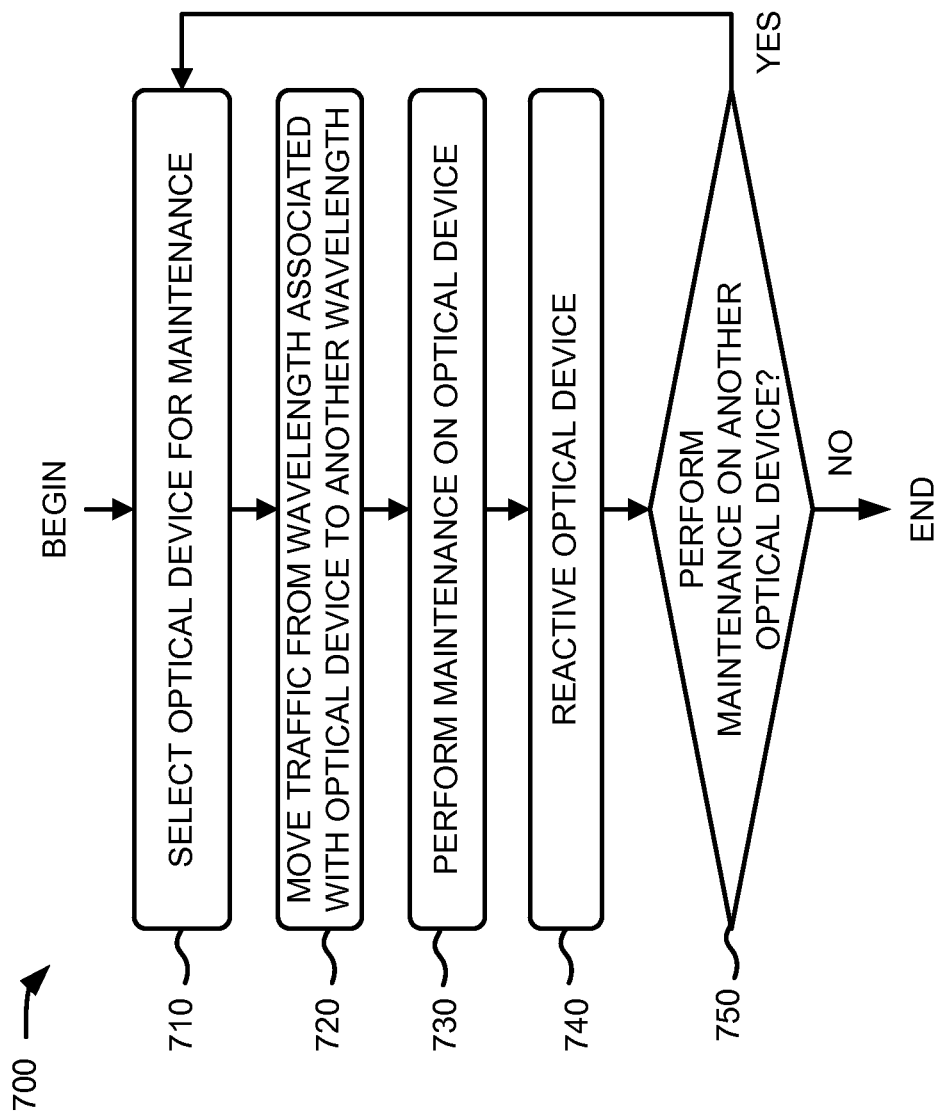

OPTICAL NETWORK SYSTEM ARCHITECTURE

BACKGROUND

A passive optical network (PON) is a type of fiber optic access network that may be used to provide a "last mile" connection between a customer premises and a larger network. For example, as described in IEEE 802.3ah, one type of PON has a point-to-multipoint network architecture in which an optical splitter distributes a signal from optical fiber to multiple premises. The PON may include an optical line terminal (OLT) at a central office associated with a service provider and optical network units (ONUs), or optical network terminals (ONTs), associated with customer premises. The data exchanged through the PON may enable the ONUs to provide a service at the customer premises, and the provided service may include, for example, telephone services (such as plain old telephone service (POTS) or voice over IP (VoIP)), data services (such as Ethernet or V.35), video services, and/or telemetry services (such as TTL, ECL, RS530, etc.).

BRIEF DESCRIPTION OF THE DRAWINGS

FIG. 6 is a flow diagram of an exemplary process for performing maintenance with respect to a pathway included in the system of FIG. 1; and FIG. 7 is a flow diagram of an exemplary process for performing maintenance related to an optical component included in the system depicted in FIG. 1.

DETAILED DESCRIPTION OF PREFERRED EMBODIMENTS

The following detailed description refers to the accompanying drawings. The same reference numbers in different drawings may identify the same or similar elements.

The systems and methods described herein relate to a communication system architecture that may provide greater reliability in an optical network as well as minimize the negative impact of events such as software downloads as seen by the customer. As described, herein, wavelengths are distributed across multiple optical devices (also referred to as "optical cards" or "blades" on the same OLT or across multiple OLTs) rather than on the optical devices, and the optical devices may be included, for example, in an OLT in a PON. Optical signals associated with a particular one of the multiple wavelengths are exchanged between a particular one of the optical devices and a customer premises via several possible optical pathways, and optical signals associated with another, different wavelength are exchanged between another one of the optical devices and the customer premises. The controller may control operations of the optical devices with respect to the multiple wavelengths. A first optical device associated with a first wavelength may operate separately from a second optical device associated with a second wavelength.

Administrative functions for the optical I/Os included in the first optical device associated with the first wavelength (e.g., initiating, monitoring, performing maintenance, updating, deactivating, etc., the I/Os) may be performed while other optical I/Os included in the second optical device associated with a second, different wavelength may continue to operate with minimum or no interruption. By placing the separate wavelengths across the optical components, reliability can be improved because a failure along the first pathway (i.e., a passive optical network operating in the first wavelength) may be addressed by switching traffic to the second pathway (a separate passive optical network operating in the second wavelength) with minimal interruptions in communications. Similarly, if an optical device, such as a card or blade, fails while transmitting and receiving signals in the first wavelength, traffic being transmitted to and from other optical devices may be transmitted instead at the second wavelength so that the central office and the customer premises may continue to operate with minimal interruptions.

Figure 1:
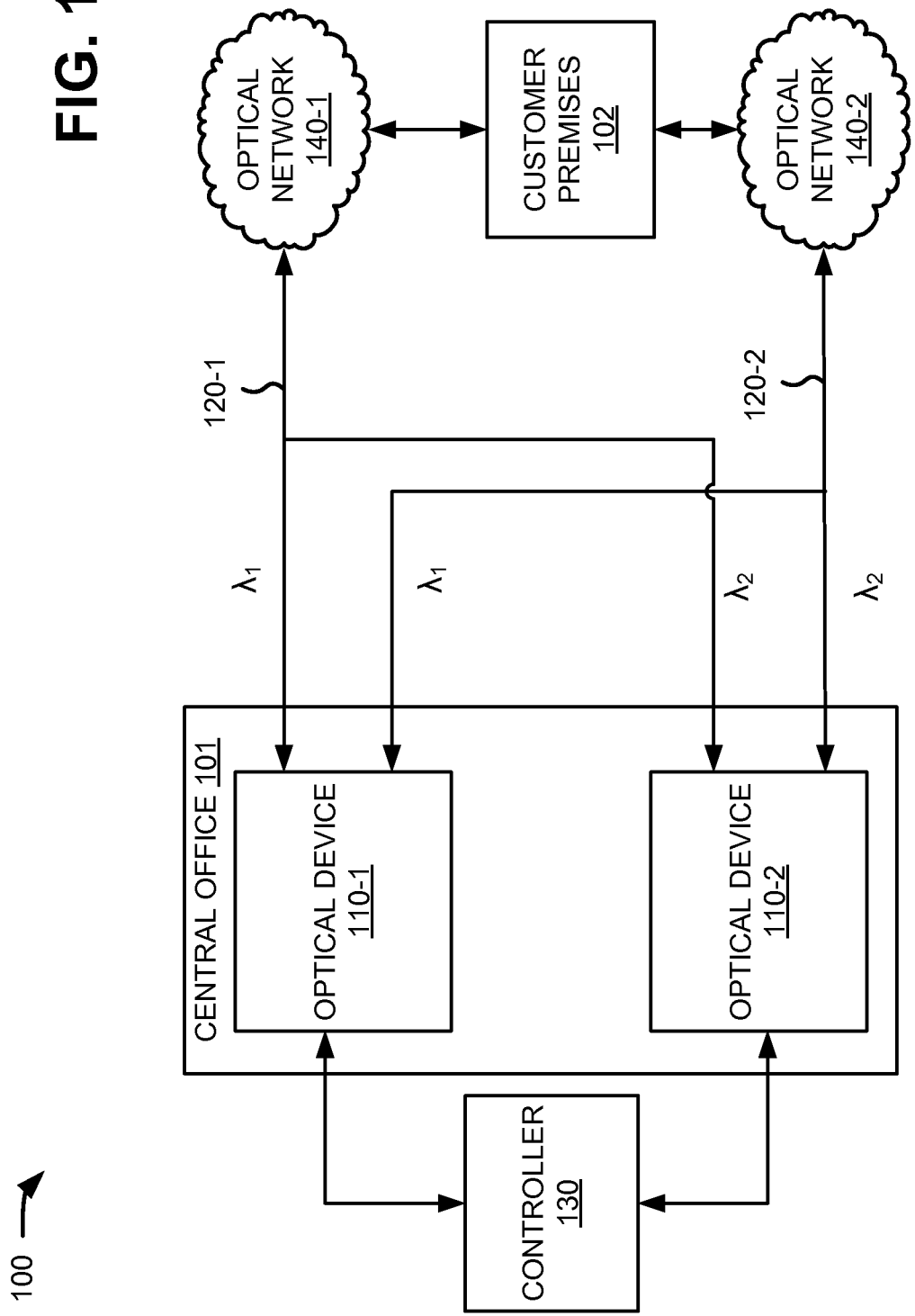
FIG. 1 illustrates an exemplary system in which systems and/or methods described herein may be implemented.

FIG. 1 is a diagram illustrating an exemplary system 100 for connecting a central office 101 to a customer premises 102 using multiple optical devices in one implementation described herein. As illustrated in FIG. 1, system 100 may include, for example, separate optical devices 110-1 and 110-2 (hereafter referred to individually or collectively as optical device 110) connected to one or more pathways 120 (hereafter referred to individually or collectively as pathway 120). Each of optical devices 110-1 and 110-2 may be associated with separate wavelengths $\lambda_1$ and wavelength $\lambda_2$. A controller 130 may control and coordinate the operation of the optical devices 110 with respect to transmissions along pathways 120. Pathways 120 may be associated with separate optical networks 140 that connect central office 110 and customer premises 102.

In system 100, the different wavelengths associated with optical devices 110 may be transmitted via different pathways 120. For example, as illustrated in FIG. 1, pathway 120-1 may carry wavelengths $\lambda_1$ and $\lambda_2$, and a separate pathway 120-2 may provide a different path for carrying wavelengths $\lambda_1$ and $\lambda_2$.

Optical device 110 may correspond, for example, to an optical blade or card that associated with optical signals carried via a PON, such as optical network 140, via pathway 120. For example, optical device 110 communicates with customer premises 102 via optical network 140 to provide data and/or services to the customer premises 102.

Figure 2:
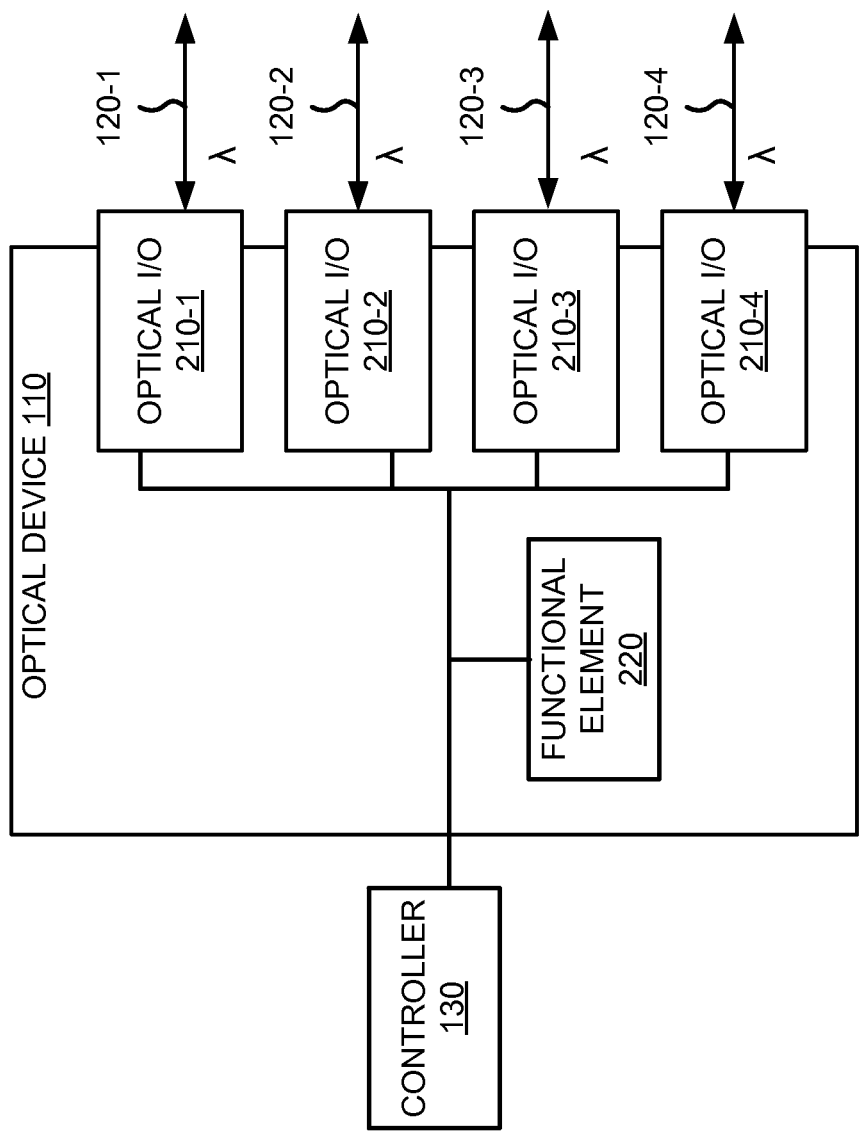
FIGS. 2 and 3 are block diagrams illustrating exemplary devices that may be included within the system of FIG. 1.

As illustrated in FIG. 2, optical device 110 may include, for example, optical I/Os 210-1, 210-2, 210-3, and 210-4 (hereafter referred to individually or collectively as optical I/O 210) and functional element 220. Optical I/O 210-1-210-4 may be associated with sending and receiving a wavelengths $\lambda$ via pathways 120-1-120-4. As described in greater with respect to FIGS. 5-7, optical device 110 may activate an optical I/O 210 in optical devices 110 and other optical I/Os 210 included in optical devices 110 may be unused until maintenance and/or a failure is detected in an optical device 110, an optical I/O 210, and/or a pathway 120.

Optical I/Os 210 may include components for sending and/or receiving optical signals to/from controller 130 via pathways 120. Optical I/O 210 may include, for example, a waveguide and/or other optical components (e.g., a lens, a prism, a filter, a polarizer, a mirror, a shaper, etc.) to transmit an optical signal via from pathways 120, a light source to generate the optical signal, a photo-detector to detect the optical signal and convert the optical signal to an electrical signal, a multiplexer to combine the optical signal with other signals, and/or a demultiplexer to separate the optical signal from other optical signals. Furthermore, optical I/O 210 may include components to input and/or output non-optical signals related to the optical signals. For example, optical I/O 210 may forward or receive an electrical signal containing data regarding the optical signal.

As depicted in FIG. 2, an individual optical I/O 210 may handle a corresponding wavelength (or range of wavelengths) associated with optical device 110, and optical device 110 may include multiple optical I/O units 210 to redundantly handle the corresponding wavelength for increased reliability. A wavelength associated with optical I/O 210 may be fixed, such that optical I/O 210 handles a particular wavelength (or a particular range of wavelengths). Alternatively, various components included in or associated with optical I/O 210 may be adjusted (or tuned) to handle different wavelengths (or ranges of wavelengths) at different times. For example, optical I/O 210 may include various components (e.g., a lens, a filter, a laser, a photo detector, etc.) that may be adjusted to vary a wavelength transmitted from and/or received by optical I/O 210.

Optical I/O 210 may further include or be connected to a port to receive optical signals from pathway 120. For example, optical I/O 210 may include a physical structure to couple to a component of pathway 120. Optical I/O 210 may direct optical signals to/from pathway 120 when coupled to pathway 120.

Although FIG. 2 depicts that each optical I/O 210 is associated with a separate pathway 120, it should be appreciated that two or more optical I/Os 210 may be coupled to a same pathway 120 or a single optical I/Os 210 may be coupled to two or more pathways 120. For example, optical device 110 may include a first type of optical I/O 210 coupled to a particular pathway 120 to output an optical signal and second, different optical I/O 210 coupled to the particular pathway 120 to receive an optical signal. A multiplexer (not depicted) may combine signals associated with a wavelengths sent/received by two optical I/Os 210 for transmission via a single pathway 120. Also, a single optical I/O 210 may send/receive optical signals in a range of wavelengths. Furthermore, while FIG. 2 depicts optical device 110 as including four optical I/Os 210, it should be appreciated that optical device 110 may include any number of optical I/Os 210, and optical device 110 may include more or less than the four optical I/Os 210 depicted in FIG. 2.

Optical device 110 may include functional element 220 to perform other tasks. For example, functional element 220 may include circuitry, memory, and/or logic to manage power use by optical device 110, monitor and provide feedback regarding performance of optical device 110, perform maintenance on optical device 110, interface optical device 110 with other devices, provide timing signals that coordinate optical I/Os 210, provide additional functionality and features to users, etc.

Although FIG. 2 shows exemplary components that may be included in optical device 110, in other implementations, optical device 110 may include fewer components, different components, additional components, or differently arranged components than depicted in FIG. 2. For example, a subset of the optical I/Os 210 included in optical device 110 may be associated with a first wavelength, and another subset of the optical I/Os 210 included in optical device 110 may be associated with a second, different wavelength. Also, functions described as being performed by respective separate components of optical device 110 may be performed by a single component, or a single function may be performed by multiple components of optical device 110.

Returning to FIG. 1, system 100 may include pathways 120 that carry optical signals between optical devices 110 at central office 101 and customer premises 102. For example, as illustrated in FIG. 1, pathways 120-1 and 120-2 may carry wavelengths $\lambda_1$ and $\lambda_{12}$ between optical devices 110 and networks 140.

Pathway 120 may include, for example, a fiber to transmit a corresponding wavelength and a multiplexor (or other optical component) to combine optical signals from optical devices 110. Pathway 120 may further include other components related to transmission of the optical signals to and from optical devices 110, such as a waveguide, a splitter, an amplifier, a polarizer, a mirror, a filter, a mirror, an attenuator, etc. For example, a particular pathway 120 may include a filter that allows optical signals of certain wavelengths or range of wavelengths, but prevents the transmission of other wavelengths via the particular pathway 120. Pathway 120 may further include a connector to couple to optical device 110. It should be appreciated that pathway 120 may include various other components.

Controller 130 may exchange status and control signals with multiple optical devices 110 to cause optical devices 110 to transmit and/or receive signals via pathways 120-1 and 120-2. As described in greater detail below, controller 130 may update, perform maintenance, monitor communications and/or perform other administrative functions with the multiple optical devices 110. In the example of FIG. 1, controller 130 may control selective transmissions of wavelengths $\lambda_1$ and/or $\lambda_2$ via pathways 120-1 and/or 120-2.

Figure 3:
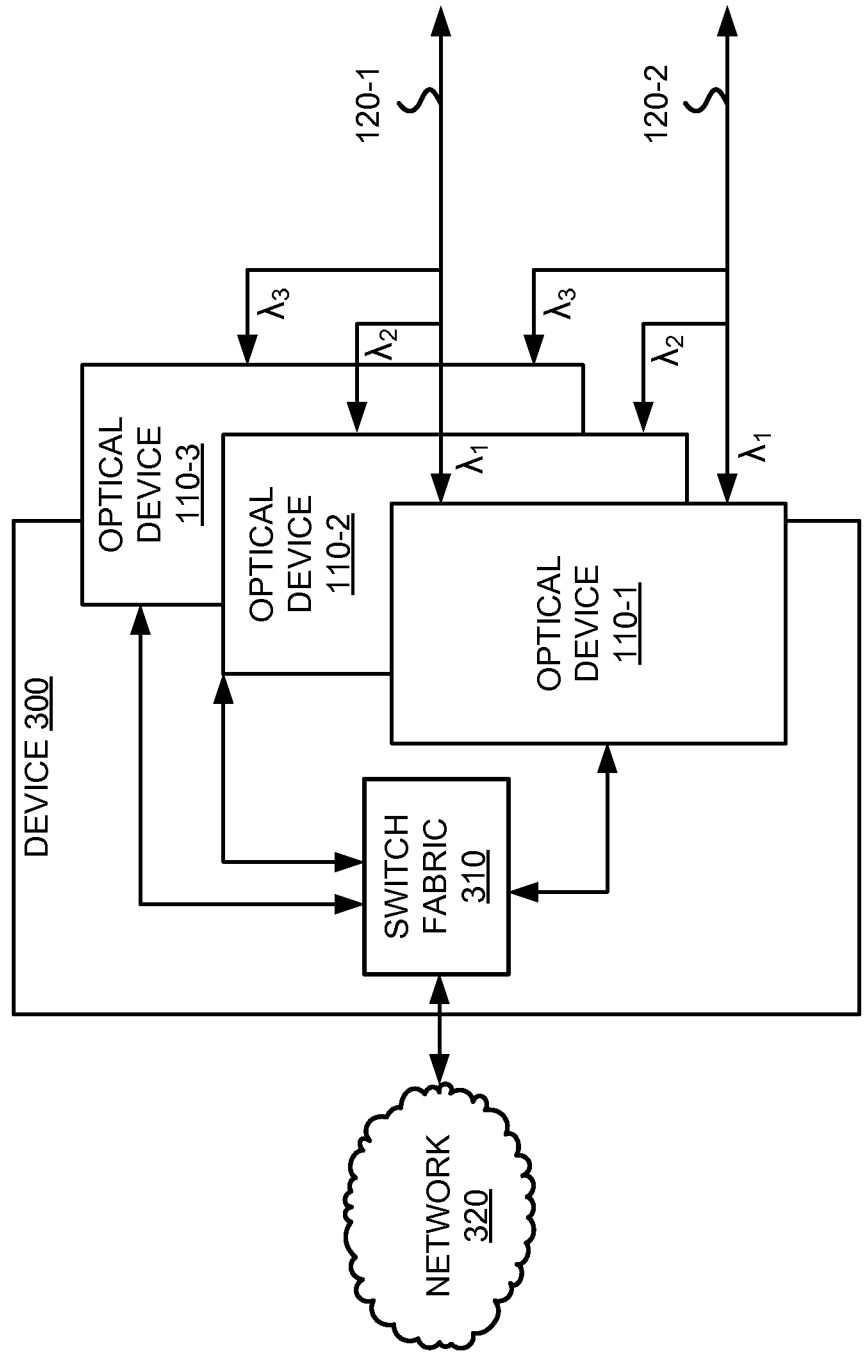

FIG. 3 illustrates an exemplary device 300 in accordance with an implementation of system 100. Device 300 may correspond, for example, to an OLT associated with central office 101 and may include multiple optical devices 110 that communicate at respective wavelengths via one or more pathways 120. In particular, FIG. 3 depicts device 300 as including three optical devices 110-1, 110-2, and 110-3, that are associated with different wavelengths $\lambda_1$-$\lambda_3$. FIG. 3 further depicts that device 300 is coupled to provide signals at wavelengths $\lambda_1$-$\lambda_3$ by pathway 120-1 and/or 120-2.

In one implementation, device 300 may include four optical devices 110 associated with a first PON (e.g., connecting to a first set of customer premises 102) and another four optical devices 110 associated with a separate PON (e.g., connecting to a second set of customer premises 102).

Switch fabric 310 may process, combine, filter, etc., optical signals sent to or received between optical devices 110 and an upstream network 320. For example, switch fabric 310 may forward an optical signal to an appropriate optical device 110 for transmission via a pathway 120 associated with at a desired wavelength. A single switch fabric 310 may handle optical signals from multiple optical devices 110. Accordingly, device 300 may include more optical devices 110 than switch fabric 310. Although device 300 depicted in FIG. 3 includes a single switch fabric 310, it should be appreciated that device 300 may include any number of switch fabrics 310. Furthermore, it should be appreciated that device 300 may include different types of switch fabric 310. For example, device 300 may include one type of switch fabric 310 that includes components and programming to perform a first function (e.g., process input signals) and another type of switch fabric 310 that includes components and programming to perform a second, different function (e.g., process output signals).

Although FIG. 3 illustrates exemplary components of device 300, in other implementations, device 300 may include fewer components, different components, differently arranged components, and/or additional components than those depicted in FIG. 3. Also, functions described as being performed by respective separate components of device 300 may be performed by a single component, or a single function may be performed by multiple components of device 300. For example, switch fabric 310 may include a multiplexer to combine various wavelengths received from optical devices 110, and/or a demultiplexer to separate composite signals received from network 320 into two or more wavelengths.

Referring again to FIG. 1, optical network 140 may include one or more components associated with a PON. For example, optical network 140 may include a fiber and various passive optical components such as a splitter, a filter, an attenuator, a modulator, etc. Optical network 140 may also include a component to couple to a device associated with a customer premises, such as an ONU.

Although FIG. 1 illustrates exemplary components of system 100, in other implementations, system 100 may include fewer components, different components, differently arranged components, and/or additional components than those depicted in system 100. Also, functions described as being performed by respective separate components of system 100 may be performed by a single component, or a single function may be performed by multiple components of system 100. For example, controller 130 may be included in one type of optical devices 110, and this type of optical device 110 may control the operation of another type of controller 130 that does not include controller 130. Also, controller 130 may be located remotely from optical device 110, and controller 130 and optical devices 110 may be connected by one or more devices, networks, and/or pathways. Furthermore, although optical devices 110 are depicted as being located at central office 101, and pathways 120 are depicted as connecting to customer premises 102, it should be appreciated that optical devices 110 and pathways 120 may connected different locations and may be located as desired.

Furthermore, in FIG. 1, the depicted particular arrangement and number of components of system 100 are illustrated for simplicity. In practice, there may be more or less optical devices 110, pathways 120, controllers 130, and optical networks 140 than depicted in FIG. 1. For example, there may be tens or even hundreds of optical devices 110 associated with a single controller 130.

Figure 4:
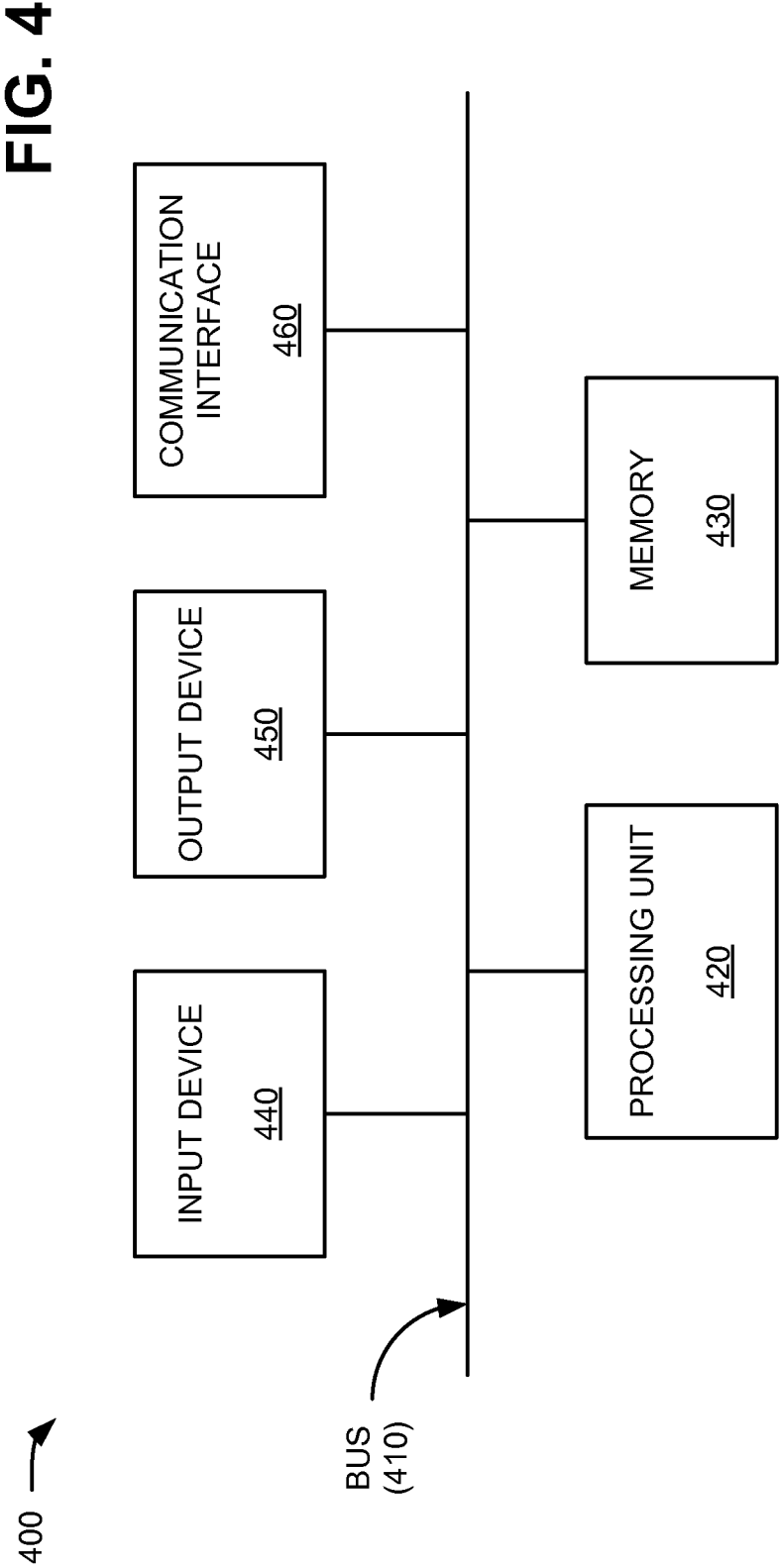
FIG. 4 is a diagram of components of an exemplary components that may be included in the devices depicted in FIGS. 2 and 3.

FIG. 4 is a diagram of exemplary components that may be included in device 400 associated with or included in system 100, such as device 300 and/or controller 130. As illustrated in FIG. 4, device 400 may include a bus 410, a processing unit 420, a memory 430, an input device 440, an output device 450, and a communication interface 460.

Bus 410 may permit communication among the components of device 400. Processing unit 420 may include one or more processors or microprocessors that interpret and execute instructions. In other implementations, processing unit 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processing unit 420, a read only memory (ROM) or another type of static storage device that stores static information and instructions for the processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, and the like. Output device 450 may include a device that outputs information to the operator, such as a display, a speaker, etc.

Communication interface 460 may include optical device 110 to enable device 400 to communicate with an optical network 140. Communication interface 460 may further include a transceiver (e.g., a transmitter and/or receiver) that enables device 400 to communicate with other devices and/or systems. For example, communication interface 460 may include mechanisms for communicating with other devices, such as other devices of network 140 or another device 400.

As described herein, device 400 may perform certain operations in response to processing unit 420 executing software instructions contained in a computer-readable medium, such as memory 430. A computer-readable medium may be defined as a non-transitory memory device. A memory device may include space within a single physical memory device or spread across multiple physical memory devices. The software instructions may be read into memory 430 from another computer-readable medium or from another device via communication interface 460. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may include fewer components, different components, differently-arranged components, or additional components than depicted in FIG. 4. As an example, in some implementations, input device 440 and/or output device 450 may not be implemented by device 400. In these situations, device 400 may be a "headless" device that does not explicitly include an input or an output device. Alternatively, or additionally, one or more components of device 400 may perform one or more other tasks described as being performed by one or more other components of device 400.

Figure 5:
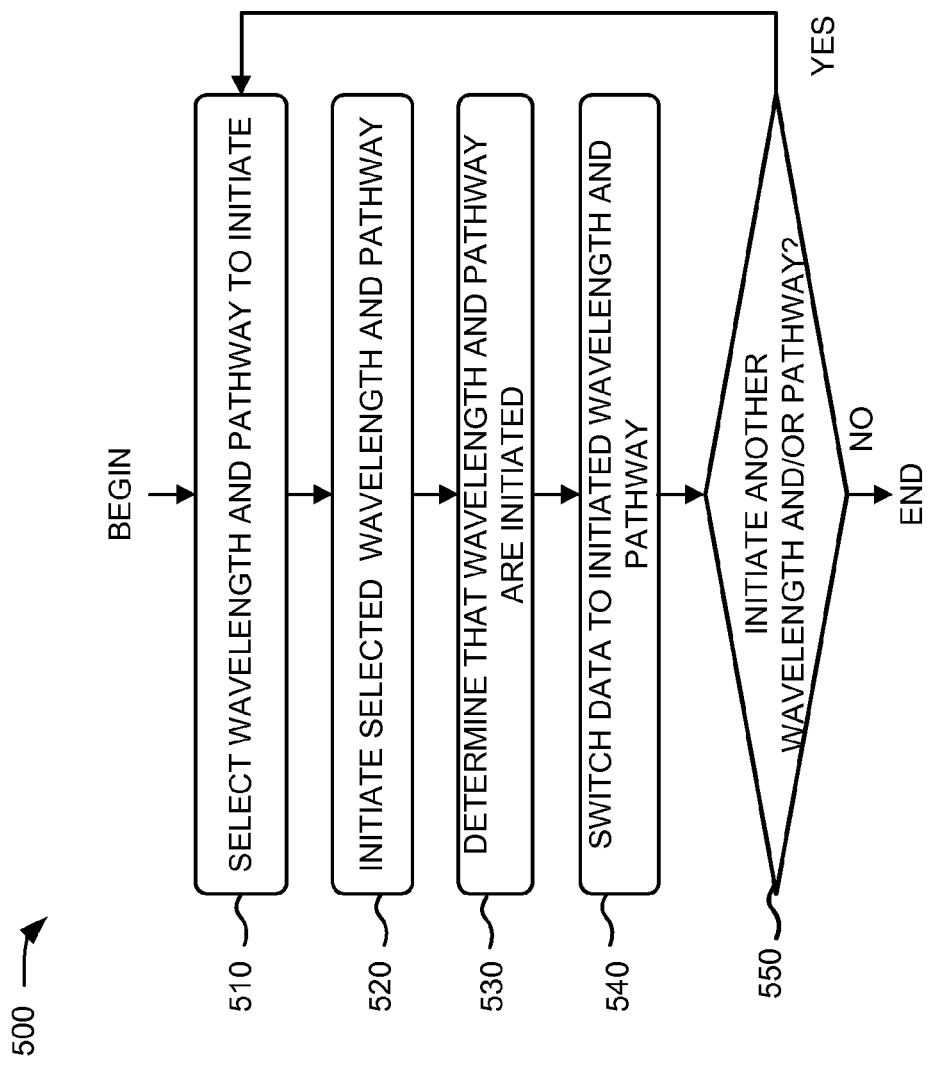
FIG. 5 is a flow diagram of an exemplary process for initiating a wavelength used to transmit data within the system of FIG. 1.

FIG. 5 provides a flow diagram of an exemplary process 500 for initiating a wavelength and a path for transmissions to and/or from an optical device 110. In one implementation, process 500 may be performed by controller 130. In other implementations, some or all of process 500 may be performed by another device or a group of devices separate from controller 130 and/or including controller 130.

A wavelength and a path to initiate are selected (block 510). For example, controller 130 may identify a particular optical I/O 210 in an optical device 110 to be activated and may identify a corresponding wavelength associated with the optical device 110 and a pathway 120 associated with the identified optical I/O 210. In the example of FIG. 1, if controller 130 determines that wavelength $\lambda_1$ and pathway 120-1 are to be activated, controller 130 may select corresponding optical I/O 210 in optical device 110-1 to activate. Additionally or in the alternative, controller 130 may determine to increase bandwidth or otherwise adjust transmissions via pathway 120-1 and may select an unused optical device 110 and may further select an optical I/O 210 associated with (i.e., coupled to) pathway 120-1. Continuing with the example of FIG. 1, if wavelength $\lambda_2$ (i.e., optical device 110-2) is already active via pathway 120-1, controller 130 may select wavelength $\lambda_1$ to activate to increase total bandwidth over paths 120-1 and may identify an appropriate optical I/O 210 in optical device 110-1 to activate.

In another implementation, selection of a wavelength and/or pathway 120 to activate in block 510 may be based on a user selection. For example, a graphical user interface (GUI) to receive data regarding a selection of a wavelength and/or pathway 120 may be provided to a user associated with one or more of optical device 110, controller 130, and/or another device associated with optical network 140, and the wavelength and/or pathway 120 may be selected based on an input received through the GUI.

The selected wavelength and/or pathway 120 may be initiated (block 520). In block 520, controller 130 may forward instructions to the optical I/O 210 identified in block 510 and/or switch fabric 310 to begin using the selected wavelength. For example, controller 130 may cause an optical I/O 210 associated with the identified pathway and/or switch fabric 310 to begin outputting and/or inputting transmissions at the selected wavelength. Controller 130 may also update routing information or other stored data used by switch fabric 310 to select a wavelength for transmission of data based on activation of optical device 110. In one implementation, multiple optical I/Os associated with a particular optical device 110 may be initiated concurrently, for example, to use multiple pathways 120. In the example of FIG. 2, both optical I/Os 210-1 and 210-2 may be concurrently initiated with respect to wavelength $\lambda_1$ to initiate transmission of signals via pathways 120-1 and 120-2.

Controller 130 may determine that the identified wavelength is initiated along the selected pathway 120 (block 530). For example, controller 130 may receive data from one or more of optical device 110 and/or switch fabric 310 indicating whether the selected wavelength is initiated along the selected pathway 120. Controller 130 may also monitor the selected pathway 120 to determine whether the particular pathway 120 is active. In the example of FIG. 1, controller 130 may monitor pathway 120-1 to identify transmissions associated with wavelength $\lambda_1$.

After the wavelength is initiated, controller 130 may switch data to the wavelength (block 540). For example, controller 130 may cause switch fabric 310 to modulate data received at another wavelength for transmission via pathway 120 at the selected wavelength. Controller 130 may also cause optical I/O 210 to exchange data at the selected wavelength. For example, controller 130 may send instructions to activate components in a particular optical I/O 210 included in the optical device 110 associated with the selected wavelength.

A determination is made whether to perform initiate another wavelength and/or pathway 120 or (block 550), and if the other wavelength and/or pathway 120 is to be initiated (block 550—yes), blocks 510-540 may be repeated with respect to the other wavelength and/or pathway. In the example of FIG. 1, if a particular optical I/O 210 included in optical device 110-1 is activated to exchange signals at wavelength $\lambda_1$ via pathway 120-1, another optical I/O 210 included in optical device 110-2 may be activated to exchange signals at wavelength $\lambda_2$ along pathway 120-1.

Although FIG. 5 shows an exemplary process 500 for initiating a wavelength and/or a pathway 120 for transmissions to and/or from optical device 110, in other implementations, additional, fewer, or different steps may be performed than those depicted in FIG. 5. For example, in another implementation, process 500 may include modifying a signal for transmission at the selected wavelength and pathway 120 may include changing an encoding, timing, and/or other property associated with the signal. In another example, the process of operating on a specific wavelength can be initiated automatically by the ONU for example when the PON card fails, and the ONU may find another wavelength on which to communicate. For example, an ONU may determine that communications using a signals at a certain wavelength (i.e., communications associated with a particular optical device 110) are unavailable and may forward messages using signals at a different wavelength (i.e., communications associated with another, different optical device 110).

FIG. 6 provides a flow diagram of an exemplary process 600 for performing maintenance related to a pathway 120 to and/or from an optical device 110. In one implementation, process 600 may be performed by controller 130. In other implementations, some or all of process 600 may be performed by another device or a group of devices separate from controller 130 and/or including controller 130.

An active pathway 120 (e.g., a pathway 120 being used to transmit traffic to and from optical devices 110) may be selected for maintenance (block 610). For example, controller 130 may identify a particular pathway 120 for maintenance and may identify corresponding wavelengths associated with signals being transmitted via the identified pathway 120. In the example of FIG. 1, if controller 130 determines maintenance related to pathway 120-1 should be performed (e.g., controller 130 determines that a fault associated with pathway 120-1 if more than a threshold number of packets are dropped or lost when transmitted along pathway 120-1, a delay or transit time associated with transmission of the data on pathway 120-1 is more than a threshold amount of time, etc.), controller 130 may select appropriate corresponding optical I/Os 210 (e.g., 210-1) in optical devices 110-1 and 110-2 for maintenance.

In another implementation, controller 130 may select a pathway 120, from multiple pathways 120 associated with optical devices 110, on a random basis, a periodic basis, and/or a round-robin basis. Continuing with the example of FIG. 1, controller 130 may select one of pathways 120 for maintenance on a periodic basis, such as selecting pathway 120-1 for maintenance at particular times (e.g., hourly, daily, weekly, etc.) and selecting pathway 120-2 for maintenance at other times. Controller 130 may also cycle through the pathways 120 and/or optical I/Os 210 of optical devices 110 such that maintenance is performed on each of wavelengths $\lambda_1$ and $\lambda_2$ and/or pathways 120 over multiple time periods, but maintenance is performed on less than all of wavelengths and pathways 120 at a time. For example, controller 130 may schedule maintenance on certain optical I/Os 210 at a time so that at least one pathway 120 is active at any time between device 300 and optical network 140 to maintain communications between device 300 and optical network 140.

Selection of a pathway 120 in block 610 may also be based on traffic conditions or other status information related to transmissions via pathways 120. In the example of FIG. 1, controller 130 may select one of pathway 120-1 or 120-2 for maintenance based on transmission conditions, such as selecting pathway 120-1 for maintenance based on determining that the different pathway 120-2 is capable of providing sufficient bandwidth to optical device 110. Alternatively or in addition, controller 130 may determine that maintenance is required with respect to wavelength $\lambda_1$ and/or pathway 120 if transmissions associated with this wavelength and pathway 120 fails one or more performance criteria (e.g., the transmission at wavelength $\lambda_1$ over pathway 120 is associated with a round-trip transmission time and/or a congestions level above a desired threshold level, an excessive number of dropped packets, etc.).

Selection of a wavelength and/or pathway 120 for maintenance in block 610 may be further based on a user input. For example, a graphical user interface (GUI) to receive data regarding a selection of a wavelength may be provided to a user associated with one or more of optical device 110, controller 130, or another device associated with optical network 140, and the wavelength and/or pathway 120 may be selected in block 610 based on an input received through the GUI.

Traffic being transmitted at the selected pathway 120 may be moved to another pathway 120 (block 620). In block 620, controller 130 may forward instructions to one or more corresponding optical I/Os 210 and/or switch fabric 310 to begin using the other pathway 120. For example, controller 130 may cause a component associated with optical I/Os 210 and/or switch fabric 310 to begin outputting and/or inputting transmissions, previously sent via selected pathway 120, at the other pathway 120. Controller 130 may also update routing information or other stored data used by optical I/Os 210 and/or switch fabric 310 to select a pathway 120 for transmission of data. In the example of FIG. 1, if pathway 120-1 is selected for maintenance, traffic being routed to/from optical devices 110-1 and 110-2 via pathway 120-1 may be rerouted to pathway 120-2. Controller 130 may also move traffic from the selected pathway 120 to multiple other pathways 120. In the example of FIG. 2, traffic associated with one of the pathways 120 (e.g., pathway 120-1) may be distributed to multiple other pathways 120-2, 120-3, and/or 120-4.

The other pathway(s) 120 may be selected from the active pathway 120 associated with optical devices 110 based on network conditions associated with the active pathways 120. In the example of FIG. 1, controller 130 may determine that pathway 120-2 may provide sufficient bandwidth (e.g., pathway 120-2 is associated with a round-trip transmission time, dropped packets, and/or a congestions level below threshold levels) to handle additional traffic while maintenance is being performed with respect to pathway 120-1. Controller 130 may reschedule maintenance of the selected pathway 120 if controller 130 determines that no other pathways 120 are available and/or would not provide sufficient bandwidth to optical devices 110. Thus, controller 130 may maintain a sufficient number of active pathways 120 to provide a sufficient level of communications to device 300.

If another pathway 120 (e.g., pathway 120-2 in the example of FIG. 1 when maintenance is being performed on pathway 120-1) is not active, the other pathway 120 may be initiated. For example, the other pathway 120 may be initiated through process 500 as described with respect to FIG. 5, and the traffic may be transmitting using the other pathway 120 after initiation.

After traffic is moved from the selected pathway 120 being maintained to another pathway 120, maintenance and/or related operations may be performed with respect to the selected pathway 120 (block 630). For example, controller 130 may forward updated software and/or firmware to a particular optical I/O 210 associated with the selected wavelength and/or pathway 120. Controller 130 may also forward instructions to cause optical device 110 to restart or otherwise perform appropriate actions to implement the updated instructions and/or code. In the example of FIG. 2, optical I/O 210-1 may receive updated software and/or firmware and may be reset to use the updated software and/or firmware.

In the example of FIG. 1, optical devices 110 may continue to receive and/or transmit traffic via pathway 120-2 while maintenance is being performed with respect to pathway 120-1. Thus, optical devices 110 may continue to operate using other optical I/Os 210 associated with pathway 120-2 during the maintenance associated with a corresponding optical I/O 210 associated with pathway 120-1.

In one implementation, maintenance may be performed on a subset of optical devices 110 (i.e., only on a single optical device 110 associated with certain wavelengths) at a time. Alternatively, maintenance may be performed on multiple optical devices 110 concurrently. In the example of FIG. 1, maintenance may be performed on one or both of optical devices 110-1 and 110-2 concurrently with respect to pathway 120-1 while communications with optical device 110-1 and 110-2 continue via pathway 120-2.

In block 630, controller 130 may also monitor, for example, a particular pathway 120 or particular optical I/Os 210 associated with the selected wavelength to determine a status of the maintenance. For example, controller 130 may receive data at the selected wavelength and/or via an associated particular pathway 120 after maintenance is completed with respect to the selected pathway 120. In addition or alternatively, an optical I/O being maintained and/or updated may forward a message and/or data to controller 130 indicating that the maintenance is completed.

After the maintenance is completed with respect to the selected wavelength and/or pathway 120, controller 130 may reinitiate the selected wavelength with respect to the pathway 120, such as reactivating a particular optical I/O 210 (block 640). For example, data may be switched back to the pathway 120 associated with the maintenance. In block 640, controller 130 may forward instructions to corresponding optical I/Os 210 and/or switch fabric 310 to begin using the pathway 120. For example, controller 130 may cause a component associated with optical I/Os 210 and/or switch fabric 310 to begin outputting and/or inputting transmissions via the selected pathway 120. Controller 130 may also update routing information or other stored data used by optical I/Os 210 and/or switch fabric 310 to resume using the selected pathway 120 for transmission of data.

Controller 130 may also cause switch fabric 310 to modulate or otherwise data received at another wavelength for transmission to optical device 110 via the selected pathway 120. Controller 130 may also cause optical I/O 210 and/or switch fabric 310 to transmit data at the selected pathway 120. In the example of FIG. 1, after maintenance is completed with respect to pathway 120-1, some signals routed via pathway 120-2 may be adjusted and/or processed for transmission via pathway 120-1.

A determination is made whether to perform maintenance on another wavelength and/or pathway 120 (block 650), and if maintenance is to be performed on the other wavelength and/or pathway 120 (block 650—yes), blocks 610-640 may be repeated with respect to the other wavelength and/or pathway 120. For example, if maintenance is desired for certain optical I/Os 210 associated with particular optical device 110, the maintenance may be staggered so that at least one of optical I/Os 210 remains active to transmit data to and from the particular optical device 110. In addition or in the alternative, maintenance may be performed on another optical device 110 transmitting via the selected pathway 120.

Although FIG. 6 shows an exemplary process 600 for performing maintenance with respect to wavelength and/or pathway 120 between optical devices 110 and customer premises 102, in other implementations, additional, fewer, or different steps may be performed than those depicted in FIG. 6. For instance, moving traffic from the selected pathway 120 to another pathway 120 in block 620 may include altering an encoding and/or encryption used with the traffic for compatibility or improved performance along the other pathway 120. Furthermore, maintenance on the selected pathway 120 may be stopped and the selected pathway 120 may be reactivated if a failure or error is identified in the other pathway 120 (e.g., more than a threshold number of packets are dropped during transmissions via the other pathway 120).

FIG. 7 provides a flow diagram of an exemplary process 700 for performing maintenance related to an optical device 110. In one implementation, process 700 may be performed by controller 130. In other implementations, some or all of process 700 may be performed by another device or a group of devices separate from controller 130 and/or including controller 130.

An optical device 110 may be selected for maintenance (block 710). In the example of FIG. 1, if controller 130 determines maintenance related to optical device 110 should be performed (e.g., controller 130 determines that a fault or failure associated with optical device 110-1 if more than a threshold number of packets at wavelength $\lambda_1$ at are dropped or lost when transmitted along pathway 120-1 and/or 120-1, a delay or transit time associated with transmission of the data at wavelength $\lambda_1$ is more than a threshold amount of time, etc.), controller 130 may select appropriate corresponding optical I/Os 210 in optical device 110-1 for maintenance. While maintenance is being performed on optical device 110, data may be transmitted using another optical device 110. In the example of FIG. 3, maintenance can be performed on optical device 110-1 while device 300 continues to exchange data using optical devices 110-2 and/or 110-3.

In another implementation, controller 130 may select an optical device 110, from multiple optical device 110 associated with device 300, on a random basis, a periodic basis, and/or a round-robin basis. Continuing with the example of FIG. 3, controller 130 may select optical device 110-1 for maintenance at particular times (e.g., hourly, daily, weekly, etc.) and may select optical devices 110-2 and/or 110-3 for maintenance at other times. Controller 130 may also cycle through optical devices 110 such that maintenance is performed on each of optical devices 110 over multiple time periods, but maintenance is performed on less than all of optical devices 110 at a time. For example, controller 130 may schedule maintenance on certain optical devices 110 at a time so that at least one other optical device 110 in device 300 is active at any time to maintain communications with device 300.

Selection of an optical device 110 in block 710 may also be based on traffic conditions or other status information related to transmissions associated with optical devices 110. In the example of FIG. 1, controller 130 may select one of optical devices 110-1 and 110-2 for maintenance based on transmission conditions, such as selecting optical device 110-1 for maintenance based on determining that the different optical device 110-2 is capable of providing sufficient bandwidth to device 300. Alternatively or in addition, controller 130 may determine that maintenance is required with respect to wavelength $\lambda_1$ if transmissions associated with this wavelength fails one or more performance criteria (e.g., the transmission at wavelength $\lambda_1$ over pathway 120 is associated with a round-trip transmission time and/or a congestions level above a desired threshold level, an excessive number of dropped packets, etc.).

Selection of an optical device 110 for maintenance in block 710 may be further based on a user input. For example, a graphical user interface (GUI) to receive data regarding a selection of optical device 110 may be provided to a user associated with one or more of optical device 110, controller 130, or another device associated with optical network 140, and optical device 110 may be selected in block 710 based on an input received through the GUI.

Traffic being transmitted at the selected optical device 110 may be moved to another optical device 110 (block 720). In block 720, controller 130 may forward instructions to one or more corresponding optical I/Os 210 and/or switch fabric 310 to begin using the other optical device 110. In the example of FIG. 3, controller 130 may cause a component associated with optical I/Os 210 in optical device 110-2 and/or switch fabric 310 to begin outputting and/or inputting transmissions, previously sent via optical device 110-1. Controller 130 may also update routing information or other stored data used by optical I/Os 210 and/or switch fabric 310 to select an optical device 110 for transmission of data. In the example of FIG. 1, if optical device 110-1 is selected for maintenance, traffic being routed to optical device 110-1 (i.e. signals associated with wavelength $\lambda_1$) may be rerouted to optical device 110-2 at wavelength $\lambda_2$. Controller 130 may also move traffic from the selected optical device 110 to multiple other optical devices 110. In the example of FIG. 3, traffic associated with one of the optical devices (e.g., optical device 110-1) may be distributed to multiple other optical devices 110-2 and 110-3 at wavelengths $\lambda_2$ and $\lambda_3$.

The other optical devices 110 may be selected from other optical devices 110 associated with device 300 based on network conditions associated with pathways 120. In the example of FIG. 1, controller 130 may determine that optical device 110-2 may provide sufficient bandwidth (e.g., optical device 110-2 is associated with a round-trip transmission time, dropped packets, and/or a congestions level below threshold levels) to handle additional traffic while maintenance is being performed with respect to optical device 110-1. Controller 130 may reschedule, delay, or bypass maintenance of the selected optical device 110 if controller 130 determines that no other optical devices 110 is available and/or would not provide sufficient bandwidth to device 300. Thus, controller 130 may maintain a sufficient number of active optical devices 110 to provide a sufficient level of communications to device 300.

If the other optical device 110 (e.g., optical devices 110-2 in the example of FIG. 1 when maintenance is being performed on optical device 110-1) is not active, the other optical device 110 may be initiated. For example, the other optical device 110 may be initiated through process 500 as described with respect to FIG. 5, and the traffic may be transmitting using the other optical device 110 after initiation.

In the example of FIG. 1, when moving traffic associated with optical device 110-1 to the other optical device 110-2, controller 130 may direct the other optical device 110-2 to continue to use an active pathway 120 used by optical device 110-1 (e.g., pathway 120-1) or may activate another pathway 120 (e.g., pathway 120-2), as needed.

After traffic is moved from the selected optical device 110 (i.e., the optical device 110 to receive maintenance) to another optical device 110, maintenance and/or related operations may be performed with respect to the selected optical device 110 (block 730). For example, controller 130 may forward updated software and/or firmware to the selected optical devices 110 as part of the maintenance. Controller 130 may also forward instructions to cause the selected optical device 110 to restart or otherwise perform appropriate actions to implement the updated instructions and/or code. In the example of FIG. 1, optical device 110-1 may receive updated software and/or firmware and may be reset to use the updated software and/or firmware while optical device 110-2 continues to operate.

In the example of FIG. 1, optical device 110-2 (associated with wavelength $\lambda_2$) may continue to receive traffic while maintenance is being performed with respect to corresponding optical device 110-0 associated with wavelength $\lambda_1$. Thus, device 300 may continue to operate using other optical devices 110-2 and/or 110-3 during the maintenance associated with another optical device 110-1.

In one implementation, maintenance may be performed on a subset of optical devices 110 (i.e., on an optical device 110 associated with a certain wavelength) at a time. Alternatively, maintenance may be performed on multiple optical devices 110 concurrently. In the example of FIG. 3, maintenance may be performed on one or both of optical devices 110-1 and 110-2 concurrently while traffic is being handled by optical device 110-3.

In block 730, controller 130 may also monitor, for example, a particular optical device 110 to determine a status of the maintenance. For example, controller 130 may receive data at a wavelength associated with optical device 110 and/or a message from optical device 110 indicating a status of the maintenance.

After the maintenance is completed with respect to the selected optical device 110, controller 130 may reinitiate the selected optical device 110 and/or an associated wavelength (block 740). For example, data may be switched back to the optical device 110 associated with the maintenance. In block 740, controller 130 may forward instructions to corresponding optical I/Os 210 and/or switch fabric 310 to begin using the wavelength associated with the optical device 110. For example, controller 130 may cause a component associated with optical I/Os 210 associated with the optical device 110 to begin outputting and/or inputting transmissions via the selected pathway 120. Controller 130 may also update routing information or other stored data used by optical I/Os 210 and/or switch fabric 310 to use the selected optical device 110 for transmission of data.

Controller 130 may also cause switch fabric 310 to modulate data received at another wavelength for transmission to or from optical device 110 at an associated wavelength. Controller 130 may also cause optical I/O 210 and/or switch fabric 310 to transmit data at the selected optical device 110. In the example of FIG. 1, after maintenance is performed with respect to optical device 110-1, some data traffic being routed by optical device 110-2 may be adjusted and/or processed for transmission at wavelength $\lambda_1$.

A determination is made whether to perform maintenance on another optical device 110 (block 750), and if maintenance is to be performed on the other optical device 110 (block 750—yes), blocks 710-740 may be repeated with respect to the other optical device 110. In the example of FIG. 3, if maintenance is desired for each of optical devices 110-1, 110-2, and 110-3, the maintenance may be staggered so that at least one of the optical devices 110-1, 110-2, and 110-3 remains active to receive from and/or transmit data while maintenance if being performed on one or more other optical device 110-1, 110-2, and 110-3.

Although FIG. 7 shows an exemplary process 700 for performing maintenance with respect to an optical device 110, in other implementations, additional, fewer, or different steps may be performed than those depicted in FIG. 7. For instance, moving traffic from the selected optical device 110 to another optical device 110 in block 720 may include altering an encoding and/or encryption used with the traffic for compatibility or improved performance for the other optical device 110. Furthermore, maintenance on the selected optical device 110 may be stopped and the selected optical device 110 may be reactivated if a failure or error is identified in the other optical device 110 (e.g., more than a threshold number of packets being transmitted by signals at a particular wavelength are dropped during transmissions).

The foregoing description provides illustration and description, but is not intended to be exhaustive or to limit the invention to the precise form disclosed. Modifications and variations are possible in light of the above teachings or may be acquired from practice of the invention. For example, while series of blocks has been described with respect to FIGS. 5-7, the order of the blocks may be modified in other implementations. Further, non-dependent blocks may be performed in parallel. Also, while the description refers to initiating a wavelength and/or performing maintenance with respect to the wavelength for transmission via a pathway, a pathway may carry a range or set of wavelengths (e.g., multiple wavelengths may be initiated for transmission via a multiplexed signal a pathway). In addition, it should be also noted that this movement between wavelengths may take place as a result of a failure of a particular optical device associated with a particular wavelength, whereby ONU my identify and communicate with another optical device associated with another, different wavelength, thus reducing down time from the failure of the particular optical device.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code, and it is understood that software and control hardware can be designed to implement these aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

In the preceding specification, various preferred embodiment have been described with reference to the accompanying drawings. It will, however, be evident that various modifications and changes may be made thereto, and additional embodiments may be implemented, without departing from the broader scope of the invention as set forth in the claims that follow. The specification and the drawing are accordingly to be regarded in an illustrative rather than restrictive sense.

What is claimed is:

1. A system comprising:
    a plurality of optical devices included in one or more optical line terminals (OLTs) and configured to exchange signals with an optical network unit (ONU) at a plurality of wavelengths and via a plurality of pathways,
        wherein the plurality of pathways includes a first pathway and a second pathway, the first pathway and the second pathway being different,
        wherein a first optical device, of the plurality of optical devices, exchanges a first one of the signals with the ONU, and a second optical device, of the plurality of optical devices, exchanges a second one of the signals with the ONU, wherein the first signal is at a first wavelength of the plurality of wavelengths and the second signal is at a second wavelength of the plurality of wavelengths, the second wavelength being different from the first wavelength, wherein the first optical device includes a first optical input/output (I/O) that, when active, exchanges the first signal via the first pathway and a second optical I/O that, when active, exchanges the first signal via the second pathway, and wherein the second optical device includes a third optical I/O that, when active, exchanges the second signal via the first pathway, and a fourth optical I/O that, when active, exchanges the second signal via the second pathway; and a controller configured to control the exchanging of the signals by the plurality of optical devices at the plurality of wavelengths, wherein the controller, when controlling the exchanging of the signals at the plurality of wavelengths, is further configured to:

initiate a passive optical network (PON) between the ONU and the one or more OLTs via the first pathway, wherein controller, when initiating the PON, activates the first optical I/O and the third optical I/O, and perform maintenance related to the first pathway, wherein the controller, when performing the maintenance, is further configured to:

deactivate the first optical I/O and the third optical I/O during the maintenance, and activate the second optical I/O and fourth optical I/O during the maintenance to cause the first signal and the second signal to be exchanged via the second pathway to maintain the PON between the ONU and the one or more OLTs during the maintenance.

2. The system of claim 1, wherein:
the first optical device is associated with a first optical card included in the one or more OLTs, and
the second optical device is associated with a second optical card included in the one or more OLTs.

3. The system of claim 1, wherein the controller is further configured to:
monitor transmissions on the first pathway,
identify a fault in the first pathway based on monitoring the transmission on the first pathway, and
determine that the maintenance related to the first pathway is needed based on identifying the fault in the pathway.

4. The system of claim 1, wherein the controller is further configured to:
monitor the first signal,
identify a fault in the first optical I/O based on monitoring the first signal, and
determine to perform the maintenance based on identifying the fault in the first optical I/O.

5. The system of claim 1, wherein the first signal is included in a plurality of first signals exchanged by the first optical device, and the first optical device exchanges the plurality of first signals at a plurality of first wavelengths that excludes the second wavelength,
wherein the controller, when initiating the PON, is further configured to cause the first optical I/O to exchange the plurality of first signals via the first pathway, and
wherein the controller, when performing the maintenance, is further configured to cause the second optical I/O to exchange the plurality of first signals via the second pathway.

6. The system of claim 1, wherein the controller, when performing the maintenance, is further configured to:
determine when the maintenance is concluded,
deactivate the second optical I/O and the fourth optical I/O based on determining that the maintenance is concluded, and
reactivate the first optical I/O and the third optical I/O based on deactivating the second optical 1/O and the fourth optical I/O to cause the first signal and the second signal to be exchanged via the first pathway.

7. The system of claim 1, wherein a third optical device, of the plurality of optical devices, exchanges a third one of the signals with the ONU, wherein the third signal is at a third wavelength of the plurality of wavelengths, wherein the third optical device includes a fifth optical I/O that exchanges the third signal via the first pathway, wherein the controller, when initiating the PON is further configured to activate the fifth optical I/O, and wherein the controller, when performing the maintenance, is further configured to maintain the fifth optical I/O during the maintenance.

8. The system of claim 1, wherein the processor, when performing the maintenance, is further configured to:
monitor the second pathway during the maintenance;
identify, based on monitoring the second pathway, a bandwidth available via the second pathway during the maintenance; and
reactivate the first optical I/O and the third optical I/O component prior to completion of the maintenance when the bandwidth available via the second pathway during the maintenance is less than a threshold amount.

9. A method comprising:
initiating, by a processor, a passive optical network (PON) between an optical network unit (ONU) and an optical line terminal (OLT), wherein:
the OLT includes a plurality of optical devices configured to exchange signals with the ONU at a plurality of wavelengths and via a plurality of pathways,
the plurality of pathways includes a first pathway and a second pathway that differ,
a first optical device, of the plurality of optical devices, exchanges a first one of the signals with the ONU, and a second optical device, of the plurality of optical devices, exchanges a second one of the signals with the ONU,
the first signal is at a first wavelength of the plurality of wavelengths, and the second signal is at a second wavelength of the plurality of wavelengths that differs from the first wavelength,
the first optical device includes a first optical input/output (1/O) that, when active, exchanges the first signal via the first pathway and a second optical I/O that, when active, exchanges the first signal via the second pathway,
the second optical device includes a third optical I/O that, when active, exchanges the second signal via the first pathway, and a fourth optical I/O that, when active, exchanges the second signal via the second pathway, and
initiating the PON includes activates the first optical I/O and the third optical I/O to initiate the PON via the first pathway;
monitoring, by the processor, the first pathway; and performing, by the processor and based on monitoring the first pathway, maintenance related to the first pathway, wherein performing the maintenance includes:
  deactivating the first optical I/O and the third optical I/O during the maintenance, and
  activating the second optical I/O and fourth optical I/O based on deactivating the first optical I/O and the second optical I/O to cause the first signal and the second signal to be exchanged via the second pathway.

10. The method of claim 9, wherein the OLT includes a first line card and a second line card, and wherein the first optical device is included in the first line card, and the second optical device is included in the second line card.

11. The method of claim 9, further comprising:
monitoring the second pathway prior to performing the maintenance;
determining, based on monitoring the second pathway, that a bandwidth available via the second pathway satisfies a threshold; and
determining to perform the maintenance based on determining that the bandwidth available via the second pathway satisfies the threshold.

12. The method of claim 9, further comprising:
monitoring the second pathway during the maintenance;
determining, based on monitoring the second pathway, a bandwidth available via the second pathway during the maintenance; and
reactivating the first optical I/O and the third optical I/O prior to completion of the maintenance when the bandwidth available via the second pathway during the maintenance is less than a threshold amount.

13. The method of claim 9, further comprising:
identifying a fault in at least one of the first optical I/O or the third optical I/O based on monitoring the first pathway, wherein the maintenance relates to the at least one of the first optical I/O or the third optical I/O.

14. The method of claim 9, further comprising:
determining when the maintenance is concluded,
deactivating the second optical I/O and the fourth optical I/O based on determining that the maintenance is concluded, and
reactivating the first optical I/O and the third optical I/O in connection with deactivating the second optical I/O and the fourth optical I/O.

15. The method of claim 9, wherein the first signal and the second signal carry data units between the ONU and the OLT, and wherein the method further comprises:
determining, while the first signal and the second signal are exchanged via the second pathway during the maintenance, a quantity of the data units that are dropped during a time unit;
deactivating, prior to completion of the maintenance, the second optical I/O and the fourth optical I/O when the quantity of data units dropped during the time period exceeds a threshold; and
reactivating the first optical I/O and the third optical I/O based on deactivating the second optical I/O and the fourth optical I/O to cause the first signal and the second signal to be exchanged via the first pathway.

16. A non-transitory computer-readable medium to store instructions, the instructions including:
one or more instructions that, when executed by a processor, cause the processor to:
  initiate an exchange of signals at plurality of wavelengths between a plurality of optical devices associated with an optical line terminal (OLT) and an optical network unit (ONU),
    wherein a first optical device, of the plurality of optical devices, exchanges signals with the ONU at a first wavelength of the plurality of wavelengths, and a second optical device, of the plurality of optical devices, exchanges signals with the ONU at a second wavelength, of the plurality of wavelengths, that differs from the first wavelength,
    wherein the first optical device includes a first optical input/output (I/O) that, when active, exchanges the first signal via a first pathway of a plurality of pathways between the OLT and the ONU and a second optical I/O that, when active, exchanges the first signal via a second pathway of the plurality of pathways,
    wherein the second optical device includes a third optical I/O that, when active, exchanges the second signal via the first pathway, and a fourth optical I/O that, when active, exchanges the second signal via the second pathway, and
    wherein initiating the exchange of signals at the plurality of wavelengths includes activating the first optical I/O and the third optical I/O to cause the first signal and the second signal to be exchanged via the first pathway;
  initiate maintenance related to the first pathway;
  deactivate the first optical I/O and the third optical I/O based on initiating the maintenance, and
  activate the second optical I/O and the fourth optical I/O based on the deactivating the first optical I/O and the third optical I/O to cause, during the maintenance, the ONU and the OLT to exchange the first signal and the second signal via the second pathway.

17. The non-transitory computer-readable medium of claim 16, wherein a passive optical network (PON) connects the OLT and the ONU, and
wherein the one or more instructions further cause the processor to:
  maintain the PON between the ONU and the OLT during the maintenance using the second pathway.

18. The non-transitory computer-readable medium of claim 16, wherein the maintenance further relates to one of the first optical I/O or the third optical I/O.

19. The non-transitory computer-readable medium of claim 16, wherein the one or more instructions further cause the processor to:
  monitor the second pathway;
  determine, based on monitoring the second pathway, that at least a threshold amount of bandwidth is available via the second pathway; and
  determine to perform the maintenance based on determining that at least the threshold amount of bandwidth is available via the second pathway.

20. The non-transitory computer-readable medium of claim 19, wherein the one or more instructions to perform the maintenance further cause the processor to:
  cause the first optical device to activate the first optical I/O and the third optical I/O to resume exchanging the first signal and the second signal via the first pathway prior to completion of the maintenance when the bandwidth available via the second pathway during the maintenance is less than the threshold amount.

* * * * *